March 16, 1926.

J. ALBRECHT 1,576,495

MECHANISM FOR MAKING BOX BOTTOMS

Filed April 26, 1922 4 Sheets-Sheet 1

John Albrecht
INVENTOR.

BY
Erwin, Wheeler & Woolard
ATTORNEYS.

March 16, 1926.

J. ALBRECHT 1,576,495

MECHANISM FOR MAKING BOX BOTTOMS

Filed April 26, 1922  4 Sheets-Sheet 3

John Albrecht
INVENTOR.

BY
Erwin, Wheeler & Woolard
ATTORNEYS.

March 16, 1926.  1,576,495
J. ALBRECHT
MECHANISM FOR MAKING BOX BOTTOMS
Filed April 26, 1922  4 Sheets-Sheet 4
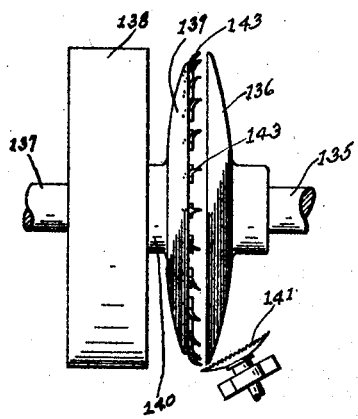
FIG. 5.
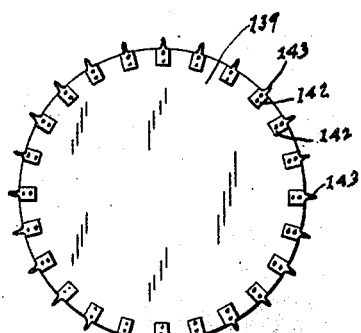
FIG. 6.
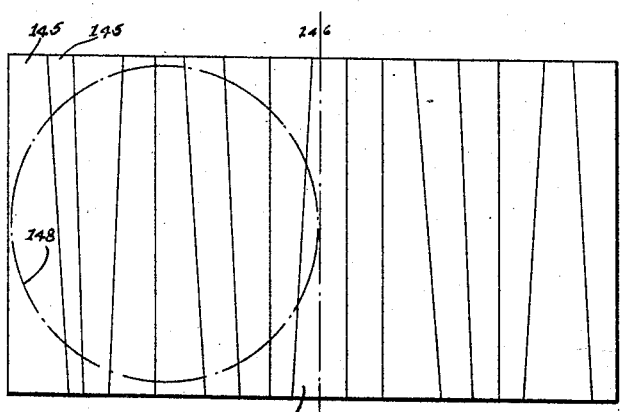
FIG. 7.
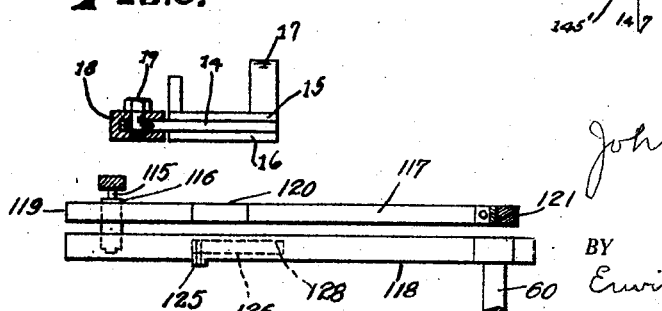
FIG. 8.
FIG. 10.
John Albrecht
INVENTOR.
BY
Erwin, Wheeler & Woolard
ATTORNEYS.

Patented Mar. 16, 1926.

1,576,495

UNITED STATES PATENT OFFICE.

JOHN ALBRECHT, OF KEWAUNEE, WISCONSIN.

MECHANISM FOR MAKING BOX BOTTOMS.

Application filed April 26, 1922. Serial No. 556,674.

*To all whom it may concern:*

Be it known that I, JOHN ALBRECHT, a citizen of the United States, residing at Kewaunee, county of Kewaunee, and State of Wisconsin, have invented new and useful Improvements in Mechanism for Making Box Bottoms, of which the following is a specification.

This invention relates to a method and mechanism for making box bottoms.

The term "box-bottoms" as used herein is intended to apply particularly to wooden disks made from matched pieces and adapted to serve as the bottoms of cheese boxes, pails, tubs, and the like.

This invention has for its broad object the simplification of box bottom manufacture, enabling a given amount of work to be turned out in less time, with fewer workmen, and with a great saving of material over what has hitherto been possible.

As hitherto universally practiced, the art of manufacturing box bottoms has involved the following difficulties:

The material used is not first quality lumber and does not come in pieces of uniform width. It has heretofore been necessary for the workman to select pieces of varying widths and shapes which, when assembled, might be cut without undue waste into box bottoms. Each piece when selected has been separately tongued and grooved. The character of the so-called "flanges" or clamping members which engage the material during the cutting operation has been such as to necessitate provision for a considerable margin of material between the outermost matched joint and the saw cut. Great care and skill in assembling were therefore required to avoid undue waste, and at best the waste has been excessive as compared with the cheaper mode of manufacture hereinafter to be disclosed.

Therefore, it is more particularly the object of this invention to enable box bottom material to be matched and assembled indiscriminately and continuously, the continuously assembled strip being cut off automatically into proper lengths and, where necessary, these lengths being sawed to a circular form without breakage or waste of material.

It is a further object of this invention to provide simple and effective mechanism enabling an unskilled workman to assemble box bottom material without any particular regard for the width or shape of individual pieces.

It is a further and important object of this invention to provide improved means for sawing the assembled material into disks, said sawing means being such as not to require the careful assembling heretofore necessary, and therefore to make feasible the use of the remaining apparatus disclosed herein.

In the drawings:

Figure 5 is a plan view of a newly devised clamping plate or so-called "flange", peculiarly adapted for use in sawing box bottom disks from the matched strips assembled by the machine shown in Figures 1 to 4 inclusive.

Figure 6 is an end view of the peculiar type of flange shown in Figure 5.

Figure 7 is a diagram illustrating the process of manufacture.

Figure 8 is a detail view of the hammer which is utilized in assembling adjacent pieces of matched material.

Figure 10 is a detail plan view of the cam levers shown in Figure 1.

Like parts are identified by the same reference characters throughout the several views.

Figure 1:
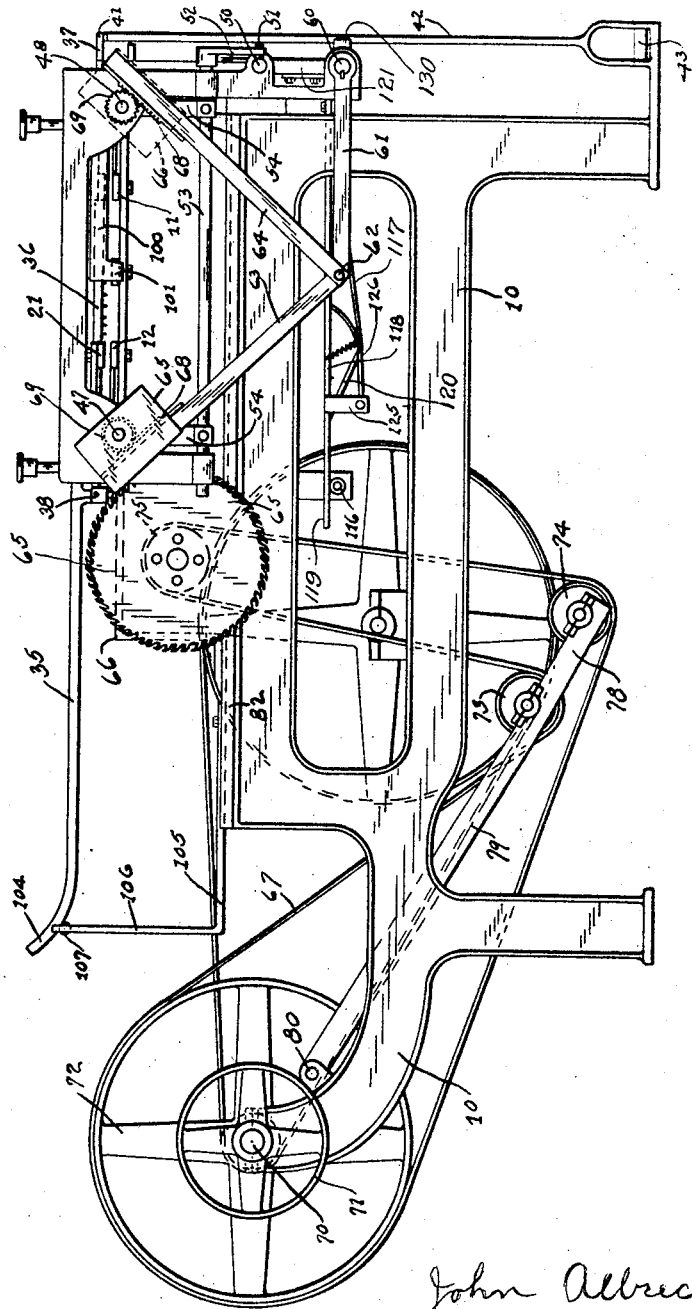
Figure 1 is an end elevation of a machine adapted for use in assembling box bottom material.

This invention contemplates the use of two separate mechanisms. The first is an assembling and automatic sawing machine adapted to facilitate the assembly and continuous operation of matched pieces in the form of a continuous strip which is sawed off into blanks of suitable length automatically as the work of assembly progresses. The assembling and sawing machine referred to is shown in Figures 1 to 4 inclusive of the drawings.

The second mechanism referred to above, comprises a device arranged to cut disks from the blanks severed by the first machine, from the continuously assembled strips of matched material. This latter mechanism is shown in Figures 5 and 6 of the drawings. It includes means for supporting the wooden blanks between two revolubly mounted clamping plates, and in proximity to a circular saw of a shape adapted to trim the margins of the blanks to circular form. The clamping plates between which the blank is held are commonly termed "flanges". This invention contemplates the use in a machine of the above described type, of a flange of peculiar construction, adapted to provide more complete support for the margins of the blank which is being trimmed, than any like machine as heretofore provided.

It has always been possible to practice the process hereinafter to be disclosed, but prior to the invention of the flange shown in Figures 5 and 6 of the drawings it was not expedient to follow the process outlined herein. Neither was it expedient to utilize an assembling machine of the type disclosed in Figures 1 to 4, since without the peculiar flange disclosed in Figures 5 and 6, the blanks automatically cut by the assembling machine could not be trimmed to disk form without great wastage of material. Consequently, it will be seen that the mechanisms and process hereinafter to be disclosed are closely allied and constitute a unitary invention.

The assembling and blank-cutting mechanism shown in Figures 1 to 4 will first be described. Upon the machine frame 10 is a working table best shown in Figures 2 and 3, which preferably consists of a pair of parallel bars 11 and 12, disposed transversely of the machine and spaced apart as shown. A suitable brace 13 may be provided for the outwardly extended ends of the bars 11 and 12.

Slidably mounted upon said bars is a hammer 14 which is provided with flanges 15 and 16, engaged above and beneath the bars, thereby maintaining the hammer in sliding engagement therewith. A handle 17 is provided for the convenience of the operator. Upon the front end of the hammer is a swivel working head 18, pivoted to the body of the hammer at 19.

The bars 11 and 12, which constitute the working table as aforesaid, are so spaced as to provide suitable support for the pieces of material laid thereon. The length of the material to be used is so proportioned to the distance separating bars 11 and 12 that the ends of the pieces of material will not project for an undue distance beyond the bars.

Supported above the bars 11 and 12 which comprise the work supporting table are cooperating pressure bars 20 and 21 respectively. The pressure bars are positioned by arms 23 and 24 which support said bars intermediate of their ends, and by the transverse member 25 which extends completely across said bars and projects beyond them on either side to a distance equal to the projecting length of arms 23 and 24.

The ends of arms 23 and 24, and of the transverse member 25, are each supported by a device 26, whereby they may be adjusted in height and may be allowed a yielding movement upwardly against an adjustable, resilient pressure. One of said devices 26 is shown in detail in Figure 9, but it will be understood that any device for accomplishing a similar purpose could be substituted therefor, inasmuch as the means for mounting the pressure bars 20 and 21 is not an important part of this invention.

Figure 9:
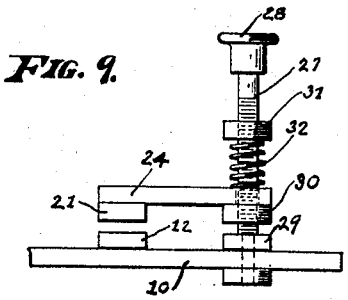
Figure 9 is a detail view showing the means for yieldably holding the material in position.

The device 26, shown in detail in Figure 9, comprises a threaded screw 27 rotatable by means of a hand wheel 28 upon its upper end, and swivelled at 29 to a relatively fixed portion of frame 10. The supporting nut 30, threaded upon screw 27, moves upwardly or downwardly when the hand wheel 28 is turned, thereby effecting the bodily vertical translation of the pressure bar 21 with respect to the fixed table bar 12. The nut 31, also threaded upon the bolt or screw 27, forms a seating for the upper end of spring 32, the lower end of which bears upon the upper surface of the arm 24. An adjustable, resilient pressure upon the upper surface of said arm is thereby provided, and said arm is free to move upwardly against said pressure responsive to upward force applied beneath the pressure bar 21.

It will be understood from the foregoing that the pieces of material assembled upon the table bars 11 and 12 are moved by the operator continuously, as assembled, beneath the pressure bars 20 and 21, which maintain a resilient pressure thereon, the spacing between the pressure bars and the table member being variable by the operation of hand wheels 28, and the pressure upon such pieces of material being variable by the operation of nut 31. The table bars 11 and 12, and the pressure bars 20 and 21, constitute together an element of this device which will hereinafter be termed a guideway.

At the inner end of the guideway two sets of clamping members are provided. One of said clamping members 34 is carried at the end of lever 35 and is adapted to be automatically actuated by means hereinafter to be described. The other of said clamping members 36 (see Figure 1) is carried by a lever 37 pivoted at 38 and provided at 39 (see Figure 2) with an outwardly extending flange forming a seating for the spring 40, whereby said lever is resiliently supported. To the end of lever 37, at 41, is pivoted a link 42 which connects said lever to a treadle member 43, whereby the operator, by the pressure of his foot, can bring down the clamping member 36 into clamping relation with the material in the guideway.

It will be noted that the guideway terminates beneath clamping member 36. Beyond the end of the guideway a suitable space is provided for the operation of a disk saw hereinafter to be described, and beyond said space is a temporary supporting table which includes supporting leaves 44 and 45 which constitute continuations of table bars 11 and 12. For a purpose hereinafter to be stated, the margins of the leaves 44 and 45 are preferably provided with a series of projections or pins 46. The leaves 44 and 45 project laterally from rods 47 and 48 respectively. Means is provided for imparting axial movement to rods 47 and 48 automatically during the operation of the machine, and automatic means is further provided for causing said rods to rotate upon their axes, thereby dropping the leaves 47 and 48 downwardly into releasing position, whereby a blank supported upon said leaves and severed automatically from the strip of material assembled in the guideway may be discharged from the machine.

Figure 2:
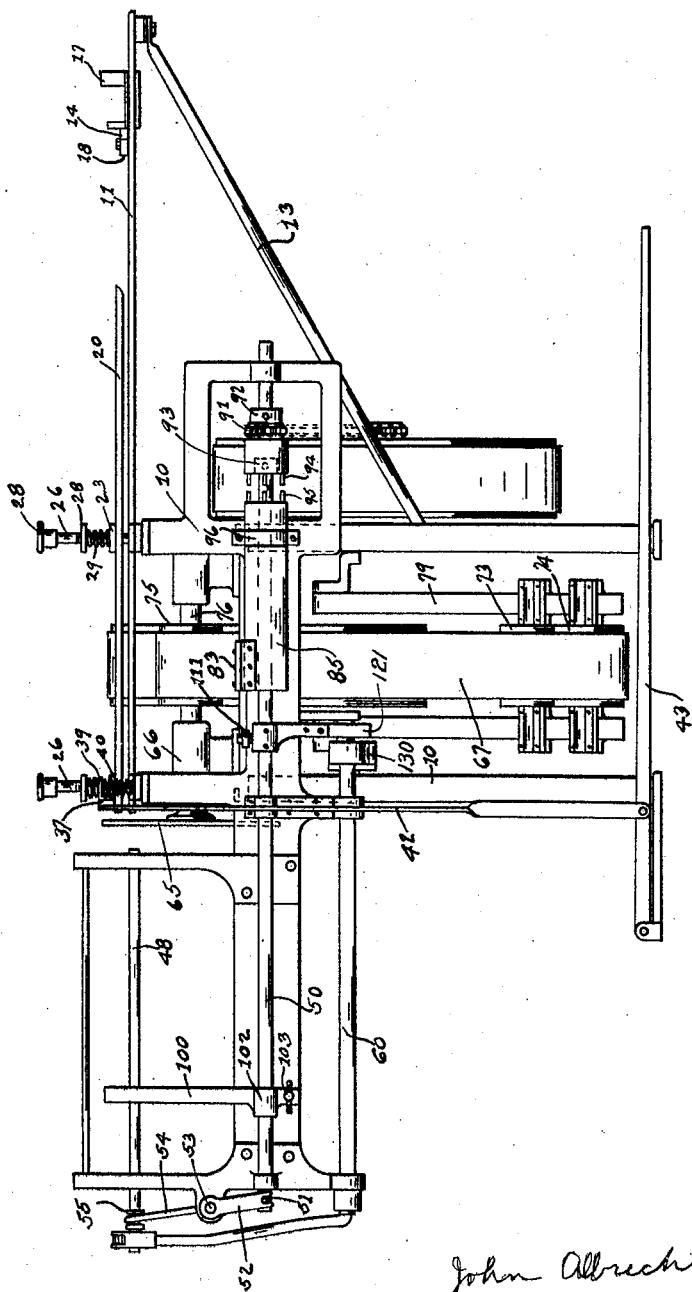
Figure 2 is a front elevation of the same.
Figure 3:
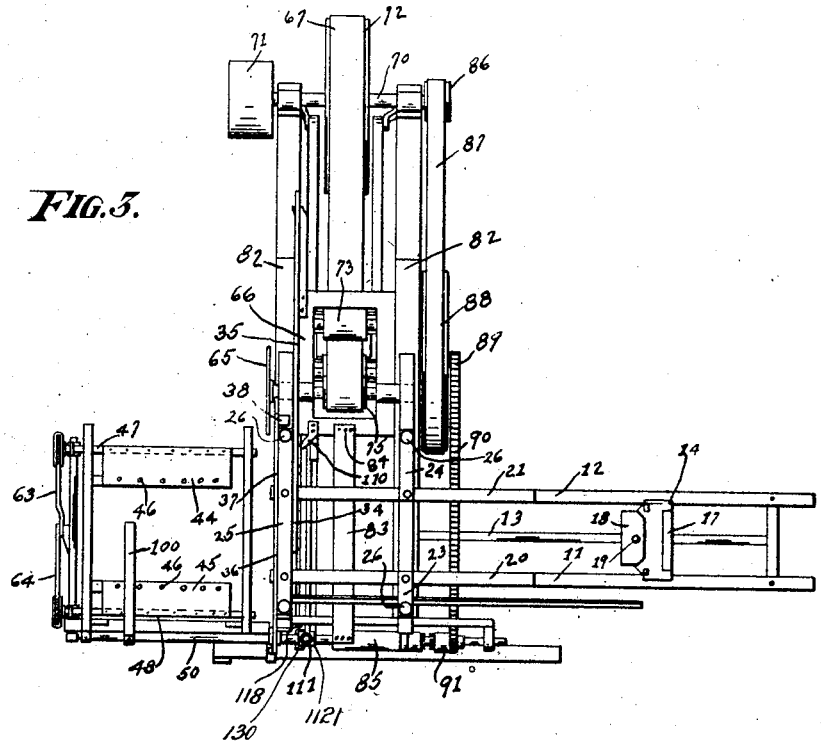
Figure 3 is a plan view on a smaller scale of the same machine.

The shaft 50, best shown in Figures 2 and 3, is axially movable under predetermined conditions. Means is provided for transmitting through pin 51, arm 52 on rock shaft 53, and the two arms 54 secured to said rock shaft and engaged with collars 55, the axial movement of shaft 50 to each of the rods 47 and 48 which carry leaves 44 and 45. It will be apparent that an axial movement of shaft 50 to the left, as viewed in Figure 2, will result in an axial movement of rods 47 and 48 to the right, and vice versa.

The shaft 60 is caused to rotate automatically under predetermined condition, and the rotation of said shaft effects the rotation in opposite directions of the rods 47 and 48 through the following mechanism. An arm 61 is keyed to shaft 60. Pivotally secured at 62 to the end of said arm are the rack bars 63 and 64. Supported by housings 68 and 68' respectively from rods 47 and 48, and each provided with teeth 68 engaged with pinions 69 carried by said rods. As viewed in Figure 1, a clockwise rotation of shaft 60 will move pivot point 62 upwardly, and will transmit through rack bar 63 a clockwise rotation to rod 47, and through rack bar 64 a counter-clockwise rotation to shaft 48. The leaves 44 and 45 will thereby be caused to drop in the manner previously described, for the purpose of discharging therefrom an assembled box bottom blank.

An automatically operable disk saw 65, mounted upon a sliding carriage 66 and continuously driven, irrespective of its position, by belt 67, is utilized for sawing off each blank from the strip of material continuously assembled in the guideway.

Power is applied to shaft 70 through pulley 71. The pulley 72 upon shaft 70 drives belt 67, which is passed about the idling pulleys 73 and 74 and thence led upwardly to a pulley 75, upon the shaft 76 which carries saw 65. The idling pulleys 73 and 74 are journaled, as shown, upon the free end 78 of a pivotally mounted frame 79 which is pivoted to the main frame 10 of the machine at 80. The weight of the free end of the pivotally mounted frame 79, applied to the belt 67 through idling pulleys 73 and 74, maintains said belt under substantially constant tension while permitting saw 65 to be driven thereby irrespective of the particular position of its slidably movable carriage 66.

The sliding carriage 66 upon which the saw is mounted travels from the rear of the machine toward the front thereof upon a slide which includes guide strips 82. The forward movement of the carriage 66 is produced by the winding of belt 83 upon a sleeve 85 which constitutes a drum or windlass therefor. One end of the belt is secured to the carriage at 84, and the opposite end is secured to sleeve 85, whereby the rotation of the sleeve will wind the belt thereon and direct carriage 66 toward the front of the machine. The rearward movement of the carriage 66 is produced by the weight of the pivotally mounted frame 79 which carries idling pulleys 73 and 74. Such rearward movement transpires, therefore, as soon as the sleeve 85 is released by the driving connection provided therefor.

Power is transmitted from shaft 70 through pulley 86, belt 87, pulley 88, sprocket wheel 89, and chain 90 to the sprocket 91, which is freely rotatable upon shaft 50 at the front of the machine. Axial movement of the sprocket in either direction with respect to shaft 50 is prevented by collars 92 and 93, said last named collar being shown in dotted lines in Figure 2 within the enlarged hub portion of sprocket wheel 91. Said hub portion is provided with clutch teeth 94 which are engageable with clutch teeth 95 by a bodily axial movement of shaft 50, together with the sprocket wheel 91 carried thereby. Said last mentioned clutch teeth are carried by the sleeve 85 which is rotatably mounted upon shaft 50 but is maintained in axial immobility by a strap 96 or other equivalent means. It will be obvious from the foregoing that when the shaft 50 is moved to the left (as viewed in Figure 2), the clutch teeth 94 carried by the continuously rotative sprocket wheel 91, will be brought into engagement with clutch teeth 95 carried by the relatively axially immovable sleeve 85. The rotative movement will thereby be imparted to sleeve 85, and the belt 83 will be wound thereon, thereby directing the sliding carriage 66 of saw 65 forwardly upon the machine, causing said rapidly rotating saw to pass the end of the guideway and to sever from the strip of material thereon a blank consisting of that portion of said material which projects from the guideway onto the leaves 44 and 45.

The axial movement of shaft 50 to the left as viewed in Figure 2, which effects the completion of driving connections to move the saw carriage forwardly, is brought about by means of a gauge 100 which is of L shaped construction and is provided with a depending finger 101 at its end (see Figure 1). The lower end of the vertical arm of gauge 100 is constructed in the form of a split collar 102 upon which clamping pressure is applied by the thumb screw 103. The gauge is thereby made adjustable axially along shaft 50, whereby it may be set to actuate said shaft when any desired length of material has been received upon the leaves 44 and 45.

It will be noted that the upper or horizontal arm of gauge 100 projects across leaf 45, and the depending finger 101 hangs in the path of the strip of material which is continuously assembled in the guide way and is fed therefrom across the leaves 44 and 45. When the end of said strip of material strikes the depending finger 101, the gauge 100, being rigidly secured to shaft 50 by the operation of clamping screw 103, moves bodily to the left as viewed in Figures 2 and 3, imparting axial movement to shaft 50 to complete the driving connections for sleeve 85 and cause the saw carriage 66 to move forward. It will thus be apparent that the gauge 100 may be set at any desired point, and that as soon as the material projecting across the path of saw 65 reaches the gauge, the saw carriage will automatically be set in motion to cut off the projecting end of the strip of material. Obviously, the blank so cut may be regulated in length by the position of gauge 100.

When the saw carriage 66 moves forwardly it is desirable to provide means for placing additional clamping pressure upon the material within the guideway. To this end the clamping device 34, similar to the device 36 shown in Figure 1, and carried at the end of lever 35 is provided. Said lever is pivoted intermediate of its ends at any suitable point. At its rear end 104, the lever is provided with an upturned portion which serves as a cam surface. An arm 105 projecting rearwardly from the saw carriage 60 is provided with an upturned portion 106, at the end of which is journaled a roller 107. As the saw carriage commences its forward movement, the roller 107 traveling beneath the cam surface 104, raises the rear end of lever 35 and moves the forward end of said lever and the clamping device 34 carried thereby downwardly into clamping relation to the material in the guideway. Said material is thus held absolutely fast during the automatic saw operation.

When the saw carriage 66 is moved forwardly to the full extent of its stroke and has completely severed a blank of proportions defined by gauge 100, a cam 110 upon the forward portion of the carriage 66 (best shown in Figures 3 and 4) contacts with a roller 111 carried by a pin 112 upwardly projecting from shaft 50. The arrangement is such that the cam 110, acting upon said shaft through the roller 111, moves the shaft to the right, as seen in Figures 2 and 3, thereby effecting the disengagement of clutch members 94 and 95, and allowing sleeve 85 to come to rest. Thereafter, as previously stated, the weight of the pivotally mounted belt-tightening frame 79 directs sliding saw carriage 66 rearwardly to its normal position, where it is shown in the drawings.

Figure 4:
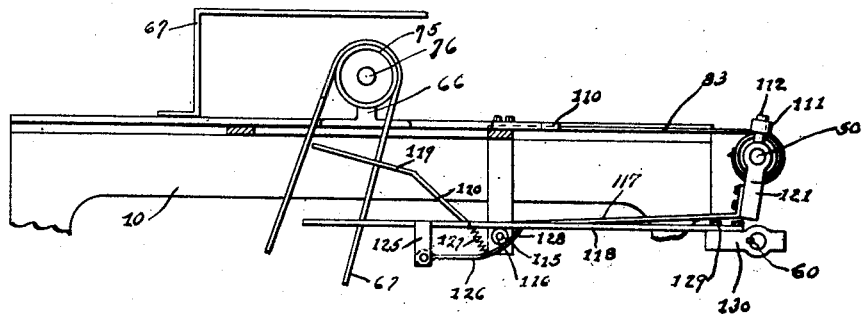
Figure 4 is a detail view of some of the cams whereby the operation of the machine is made automatic.

Projecting outwardly at the side of saw carriage 66 is an axis or stud 115 upon which a sleeve or roller 116 is rotatably journaled. These elements are best shown in Figures 1 and 4. Roller 116 acts, during the forward movement of the saw carriage 66, upon the cam lever 117. During the rearward movement of the carriage the same roller acts upon cam lever 118.

In Figure 1 the saw carriage 66 is illustrated at rest in its extreme retracted position. It will be noted that the horizontal portion 119 of lever 117 lies at the level of and behind the end of lever 118. As the saw carriage moves forwardly the roller 116 encounters the downwardly inclined section 120 of cam ever 117, thereby raising the end of said lever. The arm 121 is rigidly secured to shaft 50, and as shown in Figures 2 and 4, this member serves as a mounting for the stud 112 which carries roller 111. To its lower extremity is fastened the forward end of lever 117. The raising of said lever, therefore, effects the oscillation of shaft 50 upon its axis, imparting to said shaft the only rotative movement received by the shaft during the operation of the machine. The function of the oscillatory movement of shaft 50, brought about by the raising of the rear end of lever 117, is the lifting of finger 101 carried by gauge 100 out of the path of the blank, thereby leaving shaft 50 free to move axially to the right responsive to the engagement with roller 111 of cam 110 as heretofore described. The finger 101 is so elevated above the surface of the blank carried by leaves 44 and 45 as to be freely movable to the right over said blank.

The axial movement of shaft 50 accomplishes a further function not heretofore described. At the time said shaft is originally moved to the left, due to the engagement of the blank with gauge 100, the movement of said shaft is transmitted through the arm 52, rock shaft 53, and arms 54 to the rods 47 and 48, thereby causing said rods and the leaves 44 and 45 carried thereby to move bodily to the right. The projections 46 upon the leaves 44 and 45 will tend to engage the under surface of the uncut strip of material supported upon the leaves but due to the fact that such material is as yet unsawed, it will resist the action of teeth 46 and will remain immovable and unaffected by the movement of leaves 44 and 45 beneath it. When, however, the saw carriage 66 reaches its extreme forward position and the cam 110 carried thereby engages roller 111 upon shaft 50, said shaft will be moved violently to the right, and its movement transmitted through the means above described to rods 47 and 48 and leaves 44 and 45 will cause these last named members to move quickly to the left. The blank of material has now been severed from the continuously assembled strip by saw 65, and the total weight of said blank is carried by the sharpened projections or teeth 46. As the leaves 44 and 45, carrying said teeth, move to the left, therefore, the severed blank will be carried with them away from the path of the saw and out of range of any possible interference with that rapidly rotating member. In so moving, the blank will be carried beneath the lifted gauge 100 which is temporarily maintained in an elevated position by the action of roller 116 upon the cam lever 117.

As the saw carriage 66 moved forwardly, the roller 116 passed along the lower surface of cam lever 118. Pivotally mounted beneath the said cam member upon the depending arm 125 is provided a switch member 126 normally maintained in an elevated position by spring 127 with its curved forward end 128 in contact with the lower side of lever 118. As the roller 116 reaches the position in which it appears in Figure 4 during its forward movement, it rides upon the upper surface of the switch member 126, pressing said member from its path against the tension of spring 127. As the saw carriage 66 returns rearwardly, however, roller 116 encounters the lower surface of the curved end 128 of switch member 126, and rides beneath said member, thereby elevating cam lever 118.

Cam lever 118 is secured at 129 to the member 130 which is fast upon shaft 60. Consequently the lifting of the free end of cam lever 118, during the return movement of the saw carriage, oscillates shaft 60 upon its axis, thereby lifting arm 61 at the left hand end of the machine and transmitting the movement of said arm through the racks 67 and pinions 68 to rods 47 and 48.

As viewed in Figure 1, rod 47 is rotated clockwise and rod 48 in a counter-clockwise direction. Leaves 44 and 45 are thereby allowed to fall from their horizontal position and the blank sustained by said leaves is released and dropped between the leaves into a suitable receptacle or upon a pile of previously deposited blanks.

As the carriage 66 continues its rearward motion, the roller 116 supported therefrom rides rearwardly beneath the inclined portion 120 of cam lever 117, allowing the gauge 100 to drop back into place. Prior to the completion of the movement of carriage 66 the cam roller 116 also rides rearwardly over the pivotally mounted end of switch member 126, thereby allowing cam lever 118 to fall into normal position, thus restoring rods 47 and 48 and leaves 44 and 45 to a position where they are adapted to receive the material from which a new blank is to be cut.

The strip of material continuously assembled upon the machine illustrated in Figures 1 to 4 and 8 and 9 having been cut automatically into blanks of proper size by said machine, it is next conveyed manually or mechanically to another machine wherein the blanks are trimmed to disk-like form, and are provided with the cylindrical walls whereby complete boxes are constructed. I have filed a separate application Serial No. 538,075, "box making machine" for a machine of my invention which is adapted for use in the construction of boxes from the rectangular blanks formed as disclosed herein. The present invention, however, is not concerned with the whole of the box forming machine, but only with the particular means whereby the rectangular blanks are secured during the sawing operation which trims them to disk-like form. The clamping devices referred to are illustrated in Figures 5 and 6 herein.

The shaft 135 may be an idling shaft. Upon this shaft is rotatably mounted a clamping member 136, the face of which is preferably plane and of circular contour.

Opposed to the shaft 135 is a power driven shaft 137 upon which is mounted a drum 138, the function of which is disclosed in my co-pending application above referred to. The clamping member 139 is provided with a hub 140 slidably mounted upon the end of shaft 137, but keyed against rotation with respect to said shaft. The clamping members 136 and 139 constitute the so-called "flanges" between which the blanks to be sawed are engaged. It is the construction of flange 139 with which the invention disclosed in this application is immediately concerned.

As heretofore constructed, flanges 139 have been drilled adjacent their margins with holes into which sharpened pins have been inserted. It is the function of these pins to engage the material of the blank and to hold such material rigidly against movement during the sawing operation. The saw 141 is mounted as shown in Figure 5, and is preferably a dished disk saw. It is driven at high speed while the blank clamped between flanges 136 and 139 is rotated past it. Due to the manner above described, in which flanges 130 have previously been constructed, it has been impossible to secure a firm hold upon the wood in close proximity to the saw. When the pointed pins above referred to are put so close to the edge of disk 139 as to clamp the material of the blank adjacent to the point at which the saw will pass, the strains to which the blank is subjected by the action of the saw are sufficient to break the pins or the clamping member 139, thereby putting the machine out of operation. On the other hand, where the pins are located at a sufficient distance from the edge of disk 139 so that the danger of breakage is minimized, such pins are not sufficiently close to the edge of the blank to hold a thin strip of wood, such as may be found frequently adjacent the course of travel of saw 141. This fact has given rise to the difficulties heretofore experienced and set forth in the forepart of this specification. It has been heretofore an absolute necessity with the type of flange heretofore used to assemble the blanks separately and carefully choose for each blank the strips of material from which the blank is formed, in order that the strips of material adjacent the edges of each blank may be, when cut, of sufficient width to be properly engaged by the pins of the old type of flanges above described.

The present invention contemplates the use of a new type of flange 139. In place of the pins previously used, I employ a series of plates 142 which extend to a sufficient distance inwardly from the periphery of the disk to permit them to be secured adequately to the metal of the disk by rivets or otherwise. Each plate 142 carries at its outer end a prong 143 formed in the manner clearly shown in Figures 5 and 6. These prongs each project radially outwardly beyond the periphery of the disk and are there bent to blank engaging position. Obviously, by this means I have succeeded in supporting the material of the disk at a point exceedingly close to the course of the saw cut made by disk saw 141.

This change in the flange which may at first seem to be a minor change has made feasible the use of the assembling and automatic cutting device heretofore described. Whereas, the careful attention of skilled workmen has heretofore been necessary to assemble the blanks in such a manner that a wide strip of material could be selected for the end of each blank, by means of this invention it has been made possible for the box bottom material to be assembled continuously and with no necessity for selecting particular sizes or shapes of material for particular locations. It has been made possible for the material to be assembled continuously and sawed automatically to proper lengths irrespective of the position of the saw cut relative to any tongue and groove joint between adjacent strips of material. It has been made possible for the blanks cut from continuously assembled strips of material of this type to be trimmed round without danger either of the breakage of the flanges or the splintering of the box bottoms.

The operation of the mechanism embodying this invention is as follows.

The operator takes the previously tongued and grooved pieces of wood 145 indiscriminately and commences the assembly or matching of these pieces upon the table bars 11 and 12. This procedure is in sharp contrast to the methods previously followed, inasmuch as the operator has heretofore been obliged to select each piece of material for the purpose of insuring that wide strips of material may be left at each end of the blank for the reasons already specified.

After the first few pieces have been assembled upon the table 11 and 12, the assembling operation being continuous, the forward end of the assembled strip will pass beneath the pressure bars 20 and 21 of the guideway, and will reach the foot operated clamp 36. In a certain sense, the work thus far done has been preliminary, and it is only when the assembled strip reaches the clamping member 36 that the operation of assembling can be practiced in the manner for which the machine is designed.

Thereafter, as the operator deposits each new piece of material upon the table or guideway he will press downwardly the treadle 43 to engage the clamping member 36 with the forward end of the assembled strip and will then seize the hammer 14 with his right hand and drive it longitudinally of the guideway against the newly positioned piece of material. The forward end of the assembled strip being firmly positioned by the clamping member, the newly deposited piece of material will be driven by the hammer into a firmly matched relation to the remainder of the previously assembled strip.

The appearance of the strip in plan is shown in Figure 7. It will be noted that the pieces of material are of varying widths and lack uniformity of width throughout their length. As these strips are assembled, therefore, they will present to the hammer margins of varying angularity. In order that the hammer may not unduly mar the angularly disposed margins presented to it, the head 18 of the hammer is swiveled upon bolt 19 and is thereby enabled to accommodate itself to the margins of the wood which it encounters.

As each new piece of tongued and grooved material is driven into place by the hammer 14, the operator releases the pressure upon treadle 43, and thereby leaves the assembled strip free to move in the guideway. He thereupon utilizes the hammer to impel the entire strip forwardly in the guideway for a sufficient distance to permit of the introduction of a new strip upon table bars 11 and 12 adjacent the entrance to the guideway. It will be understood that during the operation of hammer 14 the pressure bars 20 and 21 of the guideway co-operate with table bars 11 and 12 to prevent the buckling of the assembled strip of material which might otherwise occur, in view of the fact that the forward end of said strip is firmly clamped and held immovable while the rear end thereof is subjected to the hammering action of hammer 14. As the assembled strip is moved forwardly a new piece of material is inserted behind it. The strip is clamped by a pressure upon treadle 43 and the new strip is driven home by hammer 14 in the manner already described.

It will be understood that the assembling operation above described is continuous. It is further to be understood that there is no need for the operator to select the pieces for assembly. As shown in Figure 7, the operator will, from time to time, correct any tendency for the rear edge of the assembled strip to deviate too widely from a line normal to the edge thereof. This is done simply by reversing the wide ends of adjacent strips of material, as shown in Figure 7, in order that the excessive width at the end of one piece may correct the lack of uniformity of a preceding piece. This arrangement of the pieces is done without any loss of time and practically without thought on the part of the operator. In view of the fact that no care need be exercised in selecting the strips in order to make up a blank of proper size without wastage, there is no need for the employment of skilled operators to run this machine.

Eventually, the forward end of the continuously assembled strip passes beyond the guideway across leaves 44 and 45 and reaches the depending finger 101 of gauge 100. The movement of the gauge, responsive to the pressure of the strip thereon, sets in motion the carriage 66 of the circular saw 65, and thereupon a blank is cut from the assembled strip and is discharged from the machine so quickly that the work of assembly can proceed without interruption.

When gauge 100 is moved to the left, it carries with it shaft 50, and thereby effects the engagement of clutch members 94 and 95. The driving sleeve 91 being thereby coupled to driven sleeve 85, said last named sleeve is set into rotation and winds upon itself belt 83 which is connected to the forward end of saw carriage 66. The saw carriage is thereby caused to move forwardly, the pivoted frame 79, carrying belt-tightening pulley 73 and 74, being arranged to permit the forward movement of the saw carriage while maintaining the saw in driven relation to pulley 72.

As the saw carriage begins its forward movement, the clamping member 34 is mechanically actuated into clamping position upon the assembled strip of material to be cut by the saw. Immediately thereafter the roller 116, mounted upon the depending arm of the saw carriage, acts upon cam lever 117 to oscillate shaft 50 slightly and thereby to raise the gauge 100 and its depending arm 101 out of the way of possible interference with the blank to be cut. It will further be remembered that the axial movement of shaft 50, brought about by pressure upon gauge 100, has already been communicated through rock shaft 53 to rods 47 and 48, causing said rods and the supporting sleeves 44 and 45 to shift bodily toward the path of the saw beneath the unsevered blank.

As saw carriage 66 moves forwardly, saw 65 cuts through the assembled strip upon the line indicated at 146 and 147 in Figure 7. As the carriage reaches the forward end of the machine, the cam 110 encounters roller 111 carried by shaft 50 and thereby moves shaft 50 sharply to the right, disengaging clutch members 94 and 95 and also effecting through rock shaft 53 a leftward movement of rods 47 and 48 and leaves 44 and 45, the severed blank being thereby removed from the path of the returning saw.

The saw carriage 66 is returned to its normal position at the rear of the machine by the weight of the pivotally mounted frame 79 exerted upon belt 67. As the saw carriage moves rearwardly, the roller 116 supported therefrom rides upon switch member 126, thereby lifting cam lever 118 to oscillate shaft 60 and thereby drop the leaves 44 and 45 through the mechanism already described to discharge from the machine the severed blank.

As previously stated, the whole sawing and discharging operations consume only a moment of time, and in the meantime the operator will have secured a new piece of material and will have positioned the same behind the previously assembled strip, whereby the assembling operation can proceed without hindrance in the manner already described. As each newly sawed edge is projected forwardly by the assembling of new pieces of material behind it, it reaches gauge 100 (set at any desired distance from the path of saw 65) and the saw immediately moves forwardly, thereby effecting the severance and discharge of another blank.

The discharged blanks are each inserted in turn between the clamping members or flanges 136 and 139. It will be remembered that these clamping members are so mounted as to be rotatable, and that they thereby co-operate with saw 141, enabling said saw to pass through the blank upon a circular course, indicated in Figure 7 by the line 148.

The importance of the construction of flange 139, with the projecting prongs 143 in place of the pins previously used, can now be appreciated. It will be noted by reference to Figure 7 that the piece of material 145' has been severed by saw cut 146—147 into two parts, the smaller of which is located at the extreme edge of the blank. It will be understood that in assembling the blanks no nails or glue are ordinarily employed, and that friction between the tongued and grooved members of adjacent pieces of material is relied upon to maintain the assembly of the blank. Such flanges as have heretofore been used are provided with pins or studs projecting from their faces, and a pin or stud of this type must necessarily be so far removed from the edge of the disk-like flange as to be wholly ineffective to secure in place such a thin strip of material as that portion of the piece 145' which is incorporated in the blank shown in Figure 7.

The flange which forms a part of this invention, however, is provided with prongs 143 in place of the pins previously used. The prongs project outwardly beyond the periphery of the disk or flange 139, thereby making it possible to provide support for the blank at points much closer to the course of the circular saw 141 than has heretofore been possible, while preserving the strength of the flange. By means of the flange of my invention, that portion of the piece of material 145' which is associated with the severed blank will be given adequate support by one or more of the prongs 143, and will thereby be maintained in position while the saw 141 trims the margins of the blank to the contour indicated by the broken line at 148 in Figure 7.

This operation completes the assembling and shaping of the box bottom, and the remainder of the construction of the box may thereupon be carried forward by the mechanism which forms the subject matter of my co-pending application above referred to.

While it is believed that the foregoing explanation of the operation of the mechanism of my invention affords a sufficient description of the method which I claim to be new, the method will nevertheless be separately described in order to emphasize its advantages.

The method whereby I assemble and trim box bottoms comprises; first, the continuous assembly of indiscriminately selected pieces of tongued and grooved material to form a strip which is advanced continuously in a step-by-step motion as the assembly progresses. Secondly, the forward end of the assembled strip is automaticaly sawed off into blanks of predetermined length. Third, the blanks are trimmed to circular form.

The method outlined above can be practiced upon the mechanism already described, and also upon existing mechanism varying widely from that which forms a part of the subject matter of this invention. The mechanism disclosed in this application, however, makes this method practicable for the first time. By referring to Figure 7 it will readily be seen that without the type of flange shown in Figure 6, it would be impracticable to attempt to trim to circular form a blank having at its margin the relatively narrow portion of the severed piece of material 145'. While such a blank could no doubt be trimmed to circular form by the exercise of sufficient care, and by expending a great deal of manual labor thereon, such a course would be inexpedient and would not enable a manufacturer to compete successfully in this art. It must likewise be obvious that without some means for handling blanks of the type illustrated in Figure 7, a process whereby the blanks so sawed automatically from a continuously assembled strip would be without merit, inasmuch as a great many blanks would necessarily be formed with narrow pieces at their margins, and such blanks if wasted, would entail a great loss of material. It must likewise be apparent that the only satisfactory way of assembling blanks, other than the method disclosed herein, is the way previously practised wherein each blank has been separately assembled by skilled workmen who are able to select pieces of material of such size that the assembled blank can be trimmed, without undue wastage, to circular form. By this older method, however, even the best of workmen could not help forming certain of the blanks with an excess of material to avoid the total destruction of the blank by the dished saw 141 during the trimming operation. Furthermore, the additional wages received by such skilled workmen are, considered from the viewpoint of the improvements disclosed herein, a loss, inasmuch as unskilled labor can satisfactorily operate the mechanism of this invention without waste and with a highly increased output per unit of time.

I claim:

1. In a device of the character described, the combination with a supporting table arranged for the continuous assembly thereon of a strip of matched material, an automatic cut-off saw mounted for bodily reciprocation transversely of the path of said material, whereby to sever blanks from a strip assembled on said table, a clamp operable upon said material in a plane parallel with the path of said saw, and a second clamp operable upon said material in a plane substantially parallel with the path of movement of said material on said table, said first mentioned clamp being automatically operable prior to the movement of the saw into the said material.

2. In a device of the character described, the combination with a supporting table arranged for the continuous assembly thereon of a strip of matched material, an automatic cut-off saw mounted for bodily reciprocation transversely of the path of said material, whereby to sever blanks from a strip assembled on said table, a clamp operable upon said material in a plane parallel with the path of said saw, and a second clamp operable upon said material in a plane substantially parallel with the path of movement of said material on said table, said first mentioned clamp being automatically operable prior to the movement of the saw into the said material and the second mentioned clamp being subject to the direct control of the operator and being adapted to apply resilient pressure to the said material, whereby to permit of its assembly while subject to such pressure.

3. In a device for manufacturing box bottoms, a table comprising a set of parallel supporting bars, a set of pressure bars in spaced relation to said supporting bars, a clamp operable to engage material between said supporting and pressure bars, and a hammer slidable upon said supporting bars and provided with a head so disposed as to be engageable with material supported upon said bars irrespective of the length of material supported on said bars.

4. In a device of the character described, the combination with a supporting table arranged for the continuous assembly thereon of a strip of matched material, an automatic cut-off saw mounted for bodily reciprocation transversely of the path of said material, whereby to sever blanks from a strip assembled on said table, a clamp operable upon said material in parallelism with the path of said saw, and a second clamp operable upon said material in a plane substantially parallel with the path of movement of said material on said table, said first mentioned clamp being automatically operable prior to the movement of the saw into the said material and the second mentioned clamp being subject to the direct control of the operator and being adapted to apply resilient pressure to the said material, whereby to permit of its assembly while subject to such pressure, together with a hammer guided for movement longitudinally of said table in such a plane as to be adapted to act upon marginal portions of material supported on the table, said hammer having an operating portion adapted to clear the second mentioned clamp, whereby to be adapted to act upon the work while said clamp is operatively in work engaging position.

5. Mechanism for the manufacture of box bottoms including a table arranged for the feeding there-across of a continuous strip of material, a gauge normally disposed in the path of said material, a shaft extending longitudinally of the table, a clutch member journaled upon the shaft, means for driving said clutch member continuously, means for securing said clutch member against axial movement with respect to the shaft, a sleeve journaled upon the shaft and engageable with said clutch member, a saw movable through material supported upon the table, and means for effecting the movement of said saw through the rotation of said sleeve, the arrangement being such that the engagement of said material with said gauge is adapted to move said shaft axially and effect the engagement of said clutch member with said sleeve.

6. Mechanism for the manufacture of box bottoms including an assembly table; a set of blank-supporting leaves at one end of the table; a saw carriage movable transversely of the table; a saw mounted upon said carriage and arranged to move between the end of said table and said leaves; means for permitting the movement of said leaves longitudinally to and from the path of said saw; an axially movable shaft disposed longitudinally of said table; a gauge axially adjustable upon said shaft and movable therewith; means for transmitting the axial movement of said shaft to effect the longitudinal movement in an opposite direction of said leaves; driving connections including a clutch for causing said carriage to move transversely of the table; means whereby the initial movement of the gauge and said shaft, responsive to the pressure of material upon the gauge, is adapted to effect the engagement of said clutch; and means for producing an opposite movement of said shaft at the completion of movement of said saw carriage, said opposite movement being adapted to disengage the clutch and simultaneously move said leaves in an opposite direction, whereby the blank severed by the saw is retracted from the path of the returning saw.

7. In a device having a work supporting table and a saw movable transversely of the table and adapted to sever a portion of material supported upon the table, a slidable and oscillatory work support aligned with the table and adapted to receive the portion of the work to be severed, means for effecting a forward and back saw movement across the path of such materials, a gauge controlling said means and arranged in the path of said portion to be actuated thereby, means for lifting said gauge from the path of said work support, means for sliding said work support, whereby to move the severed material beneath the lifted gauge and to remove such material from the path of the returning saw, and means for oscillating said support to discharge the severed portion of such material.

8. In combination, a table arranged for the continuous assembly of a strip of material thereon, means for severing from the strip blanks of predetermined length, said means having a forward and back reciprocable movement, a gage controlling the forward reciprocation of said severing means and means for withdrawing the severed blank from the path of said severing means upon the completion of a forward reciprocation thereof, and means for discharging each blank from the device.

9. Mechanism for manufacturing box bottoms including a table, a saw carriage movable transversely thereof, driving mechanism adapted to effect the movement of the saw carriage, a clutch included in said driving mechanism, an axially movable shaft parallel with the path of material upon the table, a gauge carried by said shaft and adapted to be moved by said material, means carried by said shaft for effecting the engagement of said clutch, means carried by the saw carriage for oscillating said shaft and thereby raising said gauge from the path of material upon the table, a member projecting from said shaft, and a cam member carried by said saw carriage and engageable with the member on the shaft, whereby said shaft is movable in a direction reverse to the movement initiated by the gauge, and whereby said clutch is disengaged and said saw carriage released.

10. Mechanism for manufacturing box bottoms including a table, a saw carriage movable transversely of the table, a set of leaves constituting an extention of the table, means for severing material supported by the leaves from material supported by the table, and means for rotating each of said leaves about an axis removed from the path of material thereon, whereby such material is discharged beneath the leaves.

11. Mechanism for manufacturing box bottoms including a table, a set of leaves constituting an extention of said table, a saw movable between the table and the leaves, a carriage for said saw, a gauge associated with the leaves and adapted to control the movement of said saw, whereby predetermined lengths of material projecting onto said leaves may be severed from the material upon the table, means controlled by the initial movement of the saw carriage for clamping to the table the material thereon, means controlled by the movement of the saw carriage for elevating the gauge out of the path of material upon the leaves, means controlled by the ultimate severing movement of the saw carriage for retracting from the path of the saw the leaves and the material carried thereon, and means controlled by the return movement of the saw for discharging from the leaves the severed material supported thereby.

12. Mechanism for the manufacture of box bottoms including a table, a saw movable transversely across the end of the table and arranged to sever from the material supported by the table a portion projecting therefrom, means controlled by the amount of the material projecting beyond the table for initiating the movement of said saw and carriage for said saw, and means controlled by said carriage for stopping said saw following its severing movement, means for retracting the carriage, means for withdrawing the severed material from the path of the returning saw, and means for discharging said material from the device.

13. Mechanism for the manufacture of box bottoms including an assembling table, a saw movable across the end of said table and arranged to sever material projecting therefrom, means controlled by the movement of material projecting from said table for initiating the movement of said saw, means for retracting the saw following the severing of projecting material, means for withdrawing from the path of the returning saw the material severed, and means for discharging such material from the machine.

14. Mechanism for the manufacture of box bottoms including a table, a saw movable transversely across the end of said table, a carriage for said saw, leaves constituting an extension of said table beyond the path of the saw, axially movable and rotatable rods supporting the leaves, an axially movable shaft disposed longitudinally of said table, a gauge mounted upon said shaft provided with an arm extended into the path of material advanced over said leaves, means for imparting the axial movement of said shaft to said rods, whereby a reverse movement is produced in said rods and leaves, mechanism including a clutch arranged for the actuation of said saw transversely of the table, means whereby the axial movement of said shaft is adapted to engage and disengage said clutch, means associated with the saw carriage for acting upon said shaft to move it in a clutch-disengaging direction, whereby said leaves are moved bodily from the path of said saw, means for retracting the saw, and means controlled by the final retracting movement of the saw for rotating said rods and leaves, whereby material supported thereon is discharged.

15. A table provided with a guideway arranged for the assembly of matched material in a continuous strip, means for supporting the matched material projecting beyond the edge of said table, and means for automatically sawing into predetermined lengths the material so projecting, means for retracting from said sawing means the severed material, and means for subsequently discharging such material from the mechanism.

16. In a device for the manufacture of box bottoms, the combination with a table arranged for the continuous assembly of pieces of matched material, of a hammer including a manually engageable portion guided for movement longitudinally of said table and a head portion swiveled to said first mentioned portion and arranged to adapt itself angularly to the margin of material on said table, a saw arranged for movement transversely of said table, means for automatically actuating said saw in its tranverse movement aforesaid, a work-engaging clamp within the control of the operator, whereby to facilitate the assembly of matched strips upon said table and to release such strips for advance across said table, and an automatically operable clamp connected for actuation during the initial forward movement of said saw, whereby to secure the work against advance during the sawing operation and to permit the continuous assembly of matched pieces by the operator without regard for the operation of the saw.

17. In a box bottom machine, the combination with a table arranged for the assembly of a strip of material from matched pieces, of a saw movable transversely of said strip and arranged to sever blanks therefrom, a discharge table aligned with said first mentioned table and arranged to support such blanks prior to and during the operation of said saw, means for retracting said saw subsequent to the sawing operation, means controlled in the initial retractive movement of the saw for moving said discharge table longitudinally from said saw, whereby to remove the blanks from possible contact with the saw, and means for subsequently discharging said blank from said table.

18. In a box bottom machine, the combination with a table arranged for the assembly of a strip of material from matched pieces, of a saw movable transversely of said strip and arranged to sever blanks therefrom, a discharge table aligned with said first mentioned table and arranged to support such blanks prior to and during the operation of said saw, means for retracting said saw subsequent to the sawing operation, means controlled in the initial retractive movement of the saw for moving said discharge table longitudinally from said saw, whereby to remove the blanks from possible contact with the saw, and means for subsequently discharging said blank from said table, said last mentioned means including mechanism arranged for the oscillation of a portion of said table to an angular position adapted to permit of the gravity discharge of the blank.

19. In a device of the character described, the combination with a supporting table and a cut-off saw mounted for movement in a direction to sever blanks from material supported on said table, of a blank receiving table mounted adjacent the path of said saw and guided for reciprocable movement to and from the path of said saw, and means automatically operated subsequent to the completion of the sawing operation for actuating said table from the path of said saw.

20. In a device of the character described, the combination with a supporting table and a cut-off saw mounted for bodily movement across the path of material supported from said table whereby to sever a blank from such material, of blank advancing means normally inoperative during the cutting movement of said saw, and means adapted to render said blank advancing means momentarily operatively subsequent to the completion of the cutting operation of said saw, whereby to withdraw the severed blank from the path of said saw.

21. In a device of the character described, the combination with a supporting table and a cut-off saw mounted for automatic operation across the material supported on said table whereby to sever blanks from such material, of a blank advancing device, a clutch member controlling the advance of said saw and its retraction, and motion transmitting connections between said clutch member and said blank advancing means, said connections being adapted to render said blank advancing means operative upon the operation of said clutch member permitting the retraction of said saw, whereby to withdraw the blank from the path of saw retraction.

22. In a device of the character described, the combination with a supporting table and a reciprocable cut-off saw adapted to act upon material supported from said table, a gage mounted in the path of material beyond the path of said saw and reciprocable to and from the path of said saw, a blank receiving table mounted beneath said gage and reciprocable to and from the path of said saw, motion transmitting connections between said gage and said table and adapted to produce opposite movement in either of said gage or said table upon the occurrence of movement in the other, and a clutch operatively arranged to control the automatic reciprocation of said saw, said clutch being connected with said gage and said blank receiving table.

23. In a device of the character described, the combination with a table and a cut-off saw mounted for movement transversely of work supported on said table, of a support for said saw, a pair of leaves mounted for reciprocation to and from the path of said saw and for oscillation about axes spaced upon either side of the path of work, said leaves being normally horizontal and adapted to receive and support material cut by said saw from the work on said table, shafts supporting said leaves in the manner aforesaid, motion transmitting connections adapted to produce reciprocal movement of said leaves, said connections being arranged to be actuated automatically in one direction by said saw supporting means, and a second set of motion transmitting connections operatively connected with said shafts to produce oscillation thereof in a direction to lower said leaves and to discharge between them material supported thereon, said second set of motion transmitting connections being operable by said saw supporting means during a returning movement of said saw subsequent to a cutting operation.

24. In a device of the character described, a work receiving support comprising a frame, a pair of spaced shafts journaled for rotation and axial reciprocation in said frame, a leaf normally supported in a horizontal position from each of said shafts, said leaves extending toward each other when in such position and being oscillatory and axially movable with the shafts which support them.

25. In a device of the character described, a work receiving support comprising a frame, a pair of spaced shafts journaled for rotation and axial reciprocation in said frame, a leaf normally supported in a horizontal position from each of said shafts, said leaves extending toward each other when in such position and being oscillatory and axially movable with the shafts which support them, a cut-off saw movable transversely with respect to said shafts, and means automatically controlled in accordance with the movements of said saw for adjusting said shafts and leaves axially and in oscillation.

26. In a device of the character described, the combination with a machine frame and a bodily movable cut-off saw, of a set of oscillatory work supporting leaves movable about axes spaced at a greater distance than the width of work to be received upon said leaves, motion transmitting connections between said leaves, whereby they are adapted to move in synchronism, a cam device including a part movable with said saw and a part connected with said leaves, said parts being formed for interaction in one direction of movement of said saw and in a given position thereof to oscillate said leaves, whereby to discharge material supported thereon.

JOHN ALBRECHT.